United States Patent [19]
Manke et al.

[11] 3,814,912
[45] June 4, 1974

[54] GUST COMPENSATION FOR ANGLE-OF-ATTACK REFERENCE AIRCRAFT SPEED CONTROL SYSTEM

[75] Inventors: Girard M. Manke, Los Angeles; Theodore J. Schuldt, Jr., Thousand Oaks, both of Calif.; James A. Klein, Dayton, Ohio

[73] Assignee: Collins Radio Company, Dallas, Tex.

[22] Filed: Jan. 4, 1973

[21] Appl. No.: 321,100

[52] U.S. Cl. ........ 235/150.2, 235/150.22, 244/77 D, 340/27 SS
[51] Int. Cl. .......................... B64c 13/16, G06g 7/70
[58] Field of Search ....... 235/150.2, 150.22, 150.23, 235/150.25; 340/27 SS; 244/77 D, 77 G, 77 R

[56] References Cited
UNITED STATES PATENTS

| | | | |
|---|---|---|---|
| 3,333,795 | 8/1967 | Hattendorf et al. | 235/150.22 |
| 3,427,581 | 2/1969 | Hartman | 235/150.2 |
| 3,578,269 | 5/1971 | Kramer et al. | 244/77 D |
| 3,596,855 | 8/1971 | Barling | 244/77 D |

Primary Examiner—Felix D. Gruber

[57] ABSTRACT

A system for deriving signals proportional to horizontal and vertical wind gust level each as the difference between an atmospheric measurement and an inertial reference and, by a threshold sensitive signal translator responsive only to negative ones of the derived signals, to subtract gust bias signals from the system angle-of-attack reference to compensate for those gust components which tend to reduce lift.

8 Claims, 3 Drawing Figures

GUST COMPENSATION FOR ANGLE-OF-ATTACK REFERENCE AIRCRAFT SPEED CONTROL SYSTEM

This invention relates generally to automatic control of aircraft and more particularly, to a means for compensating for wind gusts in a stall margin mode autothrottle.

Autothrottle systems generally operate in a stall margin mode wherein the aircraft is caused to attain a speed corresponding to some particular margin over stall speed for the particular flight configuration existing. In angle-of-attack reference autothrottle systems, the speed of the aircraft is controlled in accordance with the discrepancy between a reference angle-of-attack signal and the actual measured angle of attack of the aircraft. Thus, such systems generate an angle-of-attack reference as a function of flap position; that is, an angle-of-attack reference equivalent to, for example, 130 percent of the stall speed of the aircraft (1.3 $V_s$) for the aircraft configuration. This reference angle of attack is compared with the measured (body) angle-of-attack signal to develop an angle-of-attack error difference signal. The angle-of-attack error difference signal is utilized as a throttle rate command signal to drive a servomotor to maintain the aircraft at the desired angle of attack.

Since the lift imparted to the wing of an aircraft is a function of angle of attack and airspeed, throttle control systems based on an angle-of-attack reference are inherently affected by wind gusts, since both the airspeed and angle-of-attack parameters in the lift equation are functions of the velocity of the wind and its angular relationship with respect to the wing.

In a manual flight situation, the normal tendency of the pilot, in the presence of turbulence and winds, is to add a constant speed increase over some period of time until he feels the winds have calmed. The constant speed increase compensates for negative wind gusts which tend to reduce the lift factor. The pilot then returns to his original speed reference when he feels that the winds have calmed.

In angle-of-attack referenced throttle systems of the type automatically controlling the throttle and/or presenting to the pilot a fast-slow indication to which he may respond, there exists no external speed reference input. Thus an increment that comes in automatically during turbulence is required.

Known autothrottle systems employ various means of continuously compensating for wind gusts, but not particularly in a manner which is "natural" to the pilot. Accordingly the primary object of the present invention is the provision of an improved gust compensation means for an angle-of-attack referenced aircraft speed control system which provides compensation automatically in a manner essentially the same that a pilot would normally control the situation, that is, an increase in airspeed in the presence of turbulence and winds.

The present invention is featured in means for both atmospherically and inertially deriving signals proportional to horizontal and vertical wind gusts and for incrementally decreasing the angle-of-attack reference in accordance with predetermined levels of those detected wind gusts of a negative nature, that is, tail wind gusts and vertical gusts from above, each of which tends to decrease aircraft lift and cause undesirable sink rates.

These and other features and objects of the present invention will become apparent upon reading the following description with reference to the accompanying drawings in which.

Figure 1:
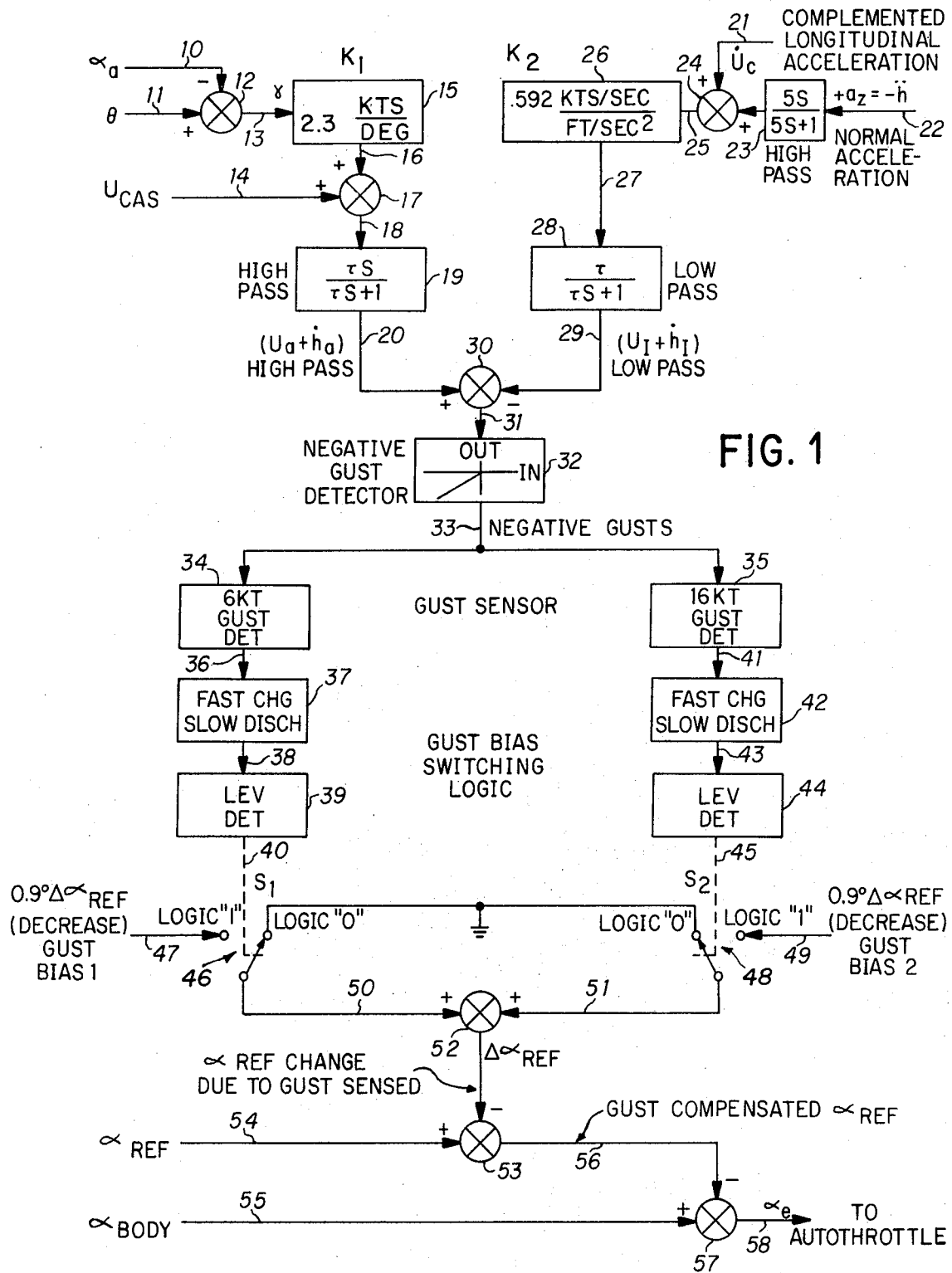
FIG. 1 is a functional block diagram of a gust compensation means for an angle-of-attack referenced autothrottle system in accordance with the present invention.

In general operation, the gust compensation means of the present invention subtracts an increment from to the angle-of-attack reference signal (which ultimately advances throttle to increase airspeed), as a function of the wind gust level encountered in the environment in which the aircraft is operating. The gust level is computed in terms of both vertical and horizontal components from derivations utilizing aircraft pitch, angle of attack, normal acceleration, calibrated airspeed, and longitudinal acceleration. Only negative ones of the detected gusts are passed to level detectors which, in response to predetermined threshold values, switch gust biases into the system angle-of-attack reference computation to decrease same, and thus compensate for the detrimental effect of a negative wind gust, since decrease in reference angle-of-attack effectively causes the aircraft speed to maintain the aircraft at an angle of attack with respect to the resultant wind vector passing over the wing to maintain a predetermined desired stall reference.

In accordance with the present invention vertical gusts ($\dot{h}$ gusts) and horizontal gusts ($\dot{U}$ gusts) may be expressed as the difference between an inertial reference and an atmospheric determination, the difference being attributed to wind gust:

$$\dot{h} \text{ gust} = \frac{\tau_{G1} S}{\tau_{G1} S + 1} (K_1)(-\alpha_a + \theta) - K_2(\ddot{h}_{ACCEL}) \frac{\tau_{G1}}{\tau_{G1} S + 1} \quad (1)$$

$$\dot{U} \text{ gust} = \frac{\tau_{G1} S}{\tau_{G1} S + 1} (U_{CAS}) - K_2(\dot{U}_{ACCEL}) \frac{\tau_{G1}}{\tau_{G1} + 1} \quad (2)$$

where:
$\alpha_a$ = body angle of attack as obtained from an angle of attack vane or probe;
$\theta$ = pitch attitude of the aircraft in degrees;
$\ddot{h}_{ACCEL}$ = the output of a normal accelerometer — ft/sec²;
$U_{ACCEL}$ = the output of a longitudinal accelerometer — ft/sec²;
$U_{CAS}$ = output of air data computer, calibrated airspeed in knots;
$\tau_{G1}$ = predetermined time constant on the accelerometer to derive a high passed inertial speed reference in both the horizontal and vertical direction;
$K_1$ and $K_2$ = conversion factors of knots/degree and knots/sec/ft/sec², respectively.

With reference to expressions 1 and 2, vertical gusts may be defined as $\dot{h}_{gust} = \dot{h}_a - \dot{h}_I$, where $\dot{h}_a$ and $\dot{h}_I$ are the respective atmosphere and inertial determinations of the vertical component of the existing gust vector. Horizontal gusts may be defined as $U_{gust} = U_a - U_I$, where $U_a$ and $U_I$ are the respective atmosphere and inertial determinations of the horizontal component of the existing gust vector. In accordance with the present invention, these vertical and horizontal components are combined algebraically and, since only negative gusts are of interest (from above and behind) since they reduce lift, the algebraic summation of the vertical and horizontal components of the existing gust is applied for subsequent angle-of-attack reference decrease only when it is negatively sensed.

Thus implementation, as concerns determination of gust level (herein defined as the algebraic combination of vertical and horizontal components of the existing gust level vector) resides in the development of a signal proportional to the vertical component of the wind gust vector from inertial input parameters as well as from atmospheric input parameters to obtain $\dot{h}_I$ and $\dot{h}_a$, respectively. Also, signals proportional to the horizontal component of the wind gust vector are derived from inertial input parameters as well as atmospheric input parameters to obtain $U_I$ and $U_a$, respectively.

Since implementation resides in ultimately obtaining an algebraic summation of $(U_a - U_I)$ and $(\dot{h}_a - \dot{h}_I)$ for application to ensuing negative gust level sensing circuitry, the implementation may take on a variety of forms. Since, however, the inertially determined signals are to be low-pass filtered, and the atmospherically determined components are to be high-pass filtered, the preferred embodiment, as depicted in FIG. 1, first obtains summations of the atmospheric determinations $(U_a + \dot{h}_a)$ and of the inertial determinations $(U_I + \dot{h}_I)$, and employs a single appropriate filtering operation on each of these respective summations. The filtered summations are then combined in a mutually subtractive sense as follows:

$$(U_a + \dot{h}_a) - (U_I + \dot{h}_I) = (U_a - U_I) + (\dot{h}_a - \dot{h}_I) \quad (3)$$

to obtain the desired summation of horizontal and vertical wind gust components, respectively. Obviously, Expression 3 might alternatively be realized by obtaining differences $(\dot{h}_a - \dot{h}_I)$ and $(U_a - U_I)$ directly, with subsequent additive combination as follows:

$$(U_a - U_I) + (\dot{h}_a - \dot{h}_I) = (U_a - U_I) + (\dot{h}_a - \dot{h}_I) \quad (4)$$

Implementation of Expression 4 would, however, necessitate a pair of low-pass filters for the inertial terms and a pair of high-pass filters for the atmosphere terms, thus doubling the filter hardware requirements.

With reference to the preferred embodiment of FIG. 1, an angle-of-attack signal 10, as might be measured from an angle-of-attack sensor, and a pitch attitude signal 11, as obtained from a pitch gyro, are subtractively combined in signal combining means 12 to produce an output signal 13 corresponding to the aircraft flight path angle $\gamma$. The flight path angle signal 13 is applied through an appropriate transfer function device 15 (such as a conversion factor multiplier) to produce a signal 16, 16 in terms of knots per degree. The signal corresponding to flight path angle $\gamma$, and a calibrated airspeed signal 14 are summed in a further signal combining means 17 to produce an output 18 which is passed through a high pass filter 19 to develop a an atmospherically derived output signal 20 which corresponds to $U_a + \dot{h}_a$.

An inertial gust level signal $(U_I + \dot{h}_I)$ is derived in FIG. 1 from accelerometer input parameters. The output 22 from a normal accelerometer is passed through a high pass filter 23 as a first input to a signal combining means 24 which receives complemented longitudinal acceleration signal 21 as a second input thereto. The output 25 from signal combining means 24 is applied through an appropriate conversion factor multiplier 26, the output 27 of which is applied to a low pass filter 28. The output 29 from low pass filter 28 comprises the sum of inertially derived horizontal and vertical gust components corresponding to low passed $U_I + \dot{h}_I$. To maintain proper sign as concerns the vertical gusts, FIG. 1 indicates that the normal accelerometer input $\ddot{h}$ is based on a positive normal acceleration (upward) implying a negative $\dot{h}$ signal. The respective atmospherically and inertially derived outputs from filters 19 and 28 are applied in a mutually subtractive sense to signal comparing means 30, the output 31 of which comprises a signal proportional to derived wind gust level.

In accordance with the present invention, only negative gust levels are utilized in the ensuing compensation circuitry and thus the ouptut 31 from signal combining means 30 is applied to a negative gust detector 32 having a transfer function as depicted such that positive gust level signals on the input 31 of detector 32 do not appear at the output 33. The output 33 from negative gust detector 32 is applied to level detectors 34 and 35 respectively designated as a 6-knot gust detector 31 and a 16-knot gust detector 35. Each of the gust level detectors 34 and 35, in response to its threshold being exceeded, develops a logic level output to an associated gust bias switching logic circuitry which switches in a gust bias to ultimately subtract from the angle-of-attack reference employed in the autothrottle system. Thus, for the exampled 6-knot and 16-knot gust detectors, the output 36 from the 6-knot gust level detector 34 is applied to a fast-charge slow-discharge circuit 37 which in essence provides an output to an ensuing logic level detector 39 to ensure that input logic zeros from the 6-knot gust detector 34 of less than a predetermined time duration will not cause the output 40 of gust detector 39 to be zero.

Figure 2:
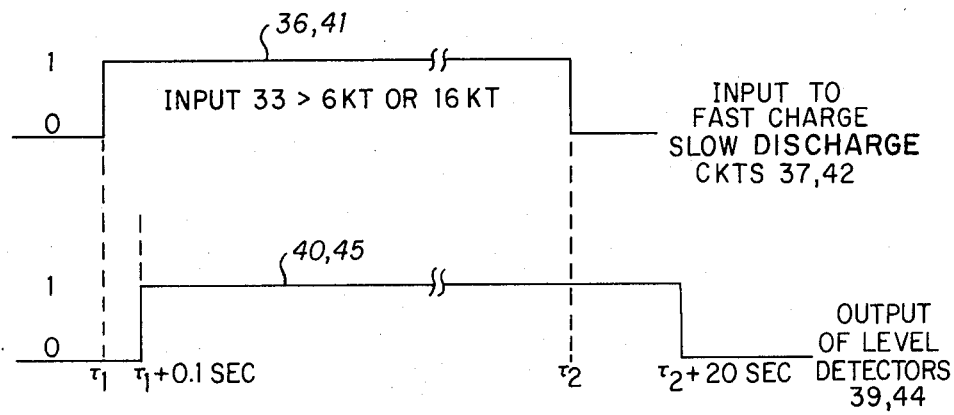
FIG. 2 is a diagrammatic representation of a gust sensing logic employed in the system of FIG. 1.

The general operating characteristic of the gust switching logic is shown in FIG. 2, where the input to the fast-charge slow-discharge circuits is depicted as being a logic 1 when the negative gust 33 applied to the gust level detectors exceed the levels defined by the detectors. Fast-charge slow-discharge circuitries 37 and 42, in response to a logic 1 input from the gust level detectors, develop a waveform having a relatively fast rise and slow decay in response to a logic 1 input, such that the ensuing level detectors 39 and 44 do not go to logic 1 until a time $t_1 + 0.1$ second and hold logic 1, due to the slow discharge characteristic of the fast-charge slow-discharge circuit, for a period of, for example, 20 seconds after the inputs to the fast-charge slow-discharge circuits fall beneath the gust level. In essence then, the level detectors 39 and 44 develop a logic 1 output for the predetermined period of 20 seconds after the detected gust level signal falls to zero. This is desirous to eliminate nuisance switching which could result from the outputs of level detectors 39 and 44 during turbulence. The fast-charge slow-discharge characteristic embodied in each of the gust bias switching logic channels ensures that, during turbulence where the outputs from the gust level sensors 34 and 35 may erratically appear and disappear, a sensed negative gust in excess of the channel threshold will cause the associated gust bias to be switched into the reference angle-of-attack mix for a predetermined period of time (20 seconds as exampled herein) after the negative gust falls beneath the detected level. Thus, in the presence of turbulence, it is seen that the appropriate gust bias is essentially constantly applied, and is switched out only when derived negative gusts at the input 33 to each of the detection channels fall beneath the embodied threshold levels for appreciable time periods.

For detected negative gusts between the exampled 6-knot and 16-knot levels, the level detector 39 produces an output logic level 40 to activate gust bias switch 46 to the logic 1 position thereof and apply a predetermined gust bias to summing circuitry 52 the output of which provides an angle-of-attack reference change as it is subsequently subtractively combined with the angle-of-attack reference signal 54 in combining means 53. Correspondingly, for detected negative gusts in excess of 16 knots, each of the gust bias channels depicted in FIG. 1 develop a logic 1 output such that an additional gust bias source 49 is applied through logic switch 48 to signal combining means 52 for subsequent subtraction from the angle-of-attack reference signal 54 in combining means 53.

Thus, the output from combining means 52 comprises a bias signal to effect a change in reference angle-of-attack in accordance with the magnitude of the sensed negative gusts appearing at the output of negative gust detector 32. The modified angle of attack reference signal 56 corresponds to a gust compensated reference angle-of-attack signal and is subtractively combined in output signal combining means 57 with the measured angle-of-attack signal 55 to develop an output angle-of-attack error signal which may be applied as an input command to the system autothrottle.

The system of the present invention adds an increment of speed to the angle-of-attack reference signal as a function of the wind gust level encountered in the environment in which the aircraft is operating and this gust level is computed by summing the filtered, computed airspeed and flight path angle with the lagged, complemented longitudinal acceleration and processed normal acceleration signals. The vertical gust compensation as defined in FIG. 1 fights the throttle's tendency to reduce airspeed for a gust from below. When a step gust from above causes the airspeed to decrease, the gust compensation does not come in at all to effect a quicker return to referenced airspeed. This may be explained as follows. The step gust from above instantaneously decreases atmospheric angle of attack. The airframe compensates by increasing pitch attitude. This in turn excites the airspeed equation, reducing airspeed. Meanwhile angle of attack begins to follow the pitch angle and angle of attack in the long term basis tends to increase. The autothrottle responds by advancing. Angle of attack is held. There is a slight pitch-up equal to $57.3/U(W_{gust})$. There is a slight decrease in airspeed. Hence, since the autothrottle responds to long term changes in angle of attack, it should apply a $\Delta\alpha_{ref}$ bias when a vertical gust ($\dot{h}_{gust}$) from above occurs. To accomplish this, the sign depicted on the derived vertical gusts ($\dot{h}_{gust}$) in FIG. 1 is such that a positively sensed normal acceleration signal 22 implies a negative $\dot{h}$.

It is noted that the system of FIG. 1 employs a time constant on the accelerometers developing the inertial values which provides a high passed inertial speed reference in both the vertical and horizontal directions. As above mentioned, this is then compared with the high-passed sensed atmospheric longitudinal and vertical airspeeds. The difference is the derived gust level. High pass filtering on both the accelerometer signals provides immunity to standoffs from these input sensors.

The longitudinal acceleration input signal 21 of FIG. 1 is preferably a complemented longitudinal acceleration signal rather than a purely inertial signal. The use of a complemented longitudinal acceleration signal eliminates effects of accelerometer standoffs.

Figure 3:
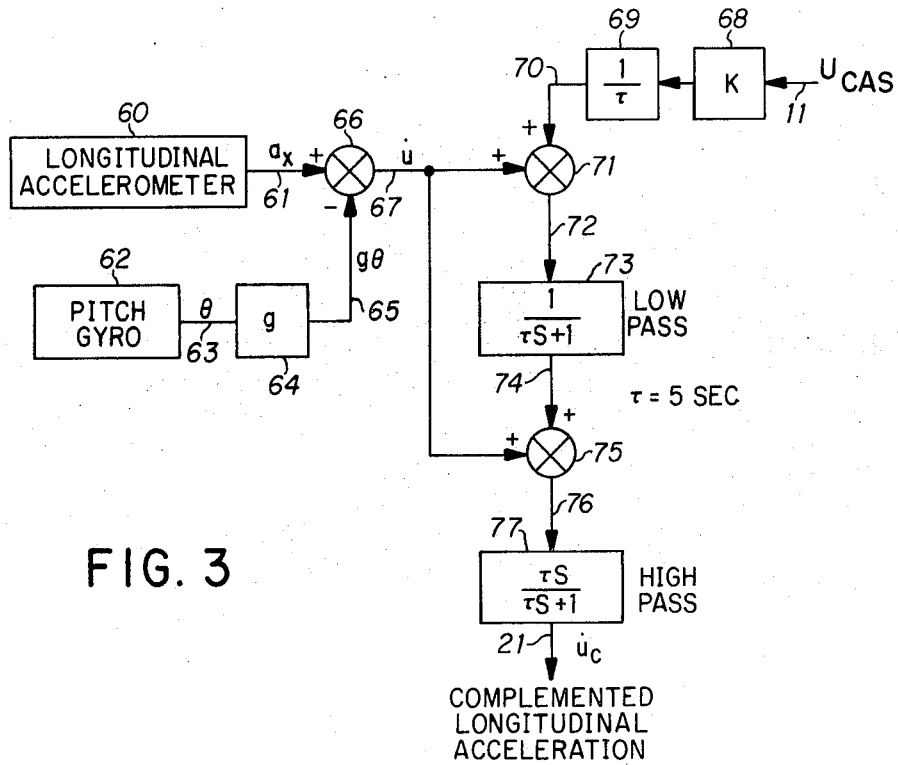
FIG. 3 is a functional diagram of a preferred means for deriving the complemented longitudinal acceleration signal input parameter to the system of FIG. 1.

FIG. 3 is a functional block diagram of a means for developing a preferred complemented longitudinal acceleration input signal 21. With reference to FIG. 3, longitudinal acceleration signal 61 from a longitudinal accelerometer is first compensated for removal of the $g\theta/57.3$ term inherently present in the output from a longitudinal accelerometer. Thus a signal comparing means 66 subtractively combines the longitudinal accelerometer output signal 61 with a pitch attitude signal 63 from pitch gyro 62 as applied through a transfer function 64. The output 67 from signal combining means 66 comprises a pitch corrected longitudinal acceleration signal. The pitch corrected signal 67 is further combined with a further longitudinal acceleration proportional signal as obtained from applying calibrated airspeed signal through controlled gain devices 68 and 69, with the output 72 from signal combining means 71 being applied to a low pass filter 73. The output 74 of filter 73 is recombined with the pitch corrected longitudinal acceleration signal 67 in signal combining means 75. The output 76 from signal combining means 75 is applied through a high pass filter 77 to develop a complemented-inertial-quality longitudinal acceleration output signal 21 as the preferred type of longitudinal acceleration input signal utilized in the system of FIG. 1.

The present invention is thus seen to provide a means of negative gust compensation by deriving horizontal and vertical gust proportional signals as the difference between corresponding signals derived from both atmospheric and inertial sources. Predetermined gust levels effect the application of predetermined gusts biases to change the system angle-of-attack reference in accordance therewith. The angle-of-attack error, corresponding to the difference beween the system angle-of-attack reference and the measured angle of attack, provides throttle control to appropriately increase airspeed in the presence of detected gust levels of predetermined magnitude. The gust compensation is therefore automatically realized in a manner that is natural to the pilot in that it does essentially what a pilot would do in the presence of turbulence and wind; that is, add a constant speed increase over a period of time until the winds have calmed upon which the original speed reference is reassumed. Since in an angle-of-attack referenced autothrottle system no external speed of reference is available, the present invention computes or derives horizontal and vertical gust signals from both atmospheric and inertial (accelerometer) sources. A comparison between the inertially developed gust components and the atmospheric references provides the difference, which is the derived gust level.

Although this invention has been described with respect to a particular embodiment thereof, it is not to be so limited as changes might be made therein which fall within the scope of the invention as defined in the appended claims.

We claim:

1. In an angle-of-attack referenced autothrottle control system for aircraft wherein a throttle command signal is formulated from the discrepancy between an angle-of-attack reference signal and a signal corresponding to existing angle-of-attack, means for deriving a signal proportional to at least one of the horizontal and vertical aircraft velocity components from signals proportional to inertial input parameters, means for deriving a signal proportional to like aircraft velocity components from signals proportional to atmospheric input parameters, signal comparing means receiving said inertially and atmospherically derived aircraft velocity signals and deriving the algebraic difference therebetween as a derived wind gust level signal, and threshold sensitive means receiving said derived wind gust level signal and being responsive thereto to subtract an increment from said reference angle-of-attack signal upon said derived wind gust level signal exceeding a predetermined threshold.

2. A system as defined in claim 1 comprising signal translating means receiving said derived gust level signal and passing only those of a first sense to said threshold sensitive means to the exclusion of those of a sense opposite that of said first sense.

3. A system as defined in claim 2 wherein said threshold sensitive means comprises means for subtracting a gust bias level signal from said reference angle-of-attack signal upon a derived wind gust level, as passed by said signal translating means, exceeding a first predetermined threshold.

4. A system as defined in claim 2 wherein said threshold sensitive means comprises means for successively subtracting individual ones of a plurality of gust bias signal sources from said reference angle-of-attack signal upon said wind gust level, as passed by said signals translating means, exceeding respective successively higher predetermined threshold levels.

5. A system as defined in claim 2 wherein said means for deriving aircraft velocity components from inertial input parameters comprises means for deriving first and second high pass filtered inertial speed reference signals in both the vertical and horizontal directions from respective longitudinal and normal accelerometer input parameters; said means for deriving aircraft velocity components from atmospheric input parameters comprises means for deriving a vertical speed signal from pitch attitude and measured angle-of-attack input parameters and means for deriving a horizontal speed signal from calibrated airspeed.

6. A system as defined in claim 5 wherein said means for deriving said inertial speed references comprises first means for combining output signals from a longitudinal accelerometer and a normal accelerometer, low pass filtering means receiving the output from said first means for combining; said means for deriving said velocity components from atmospheric input parameters comprising means for subtractively combining the output signal from an angle-of-attack sensor and a signal proportional to aircraft flight path angle, further means for combining said flight path angle signal and a signal proportional to calibrated airspeed, high-pass filtering means receiving the output of said further means for combining; and said signal comparing means receiving the respective outputs from said low-pass and high-pass filtering means.

7. A system as defined in claim 6 wherein said threshold sensitive means comprises means for subtracting a gust bias level signal from said reference angle-of-attack signal upon a derived wind gust level as passed by said signal translating means, exceeding a first predetermined threshold.

8. A system as defined in claim 6 wherein said threshold sensitive means comprises means for successively subtracting individual ones of a plurality of gust bias signal sources from said reference angle-of-attack signal upon said wind gust level, as passed by said signal translating means, exceeding respective successively higher predetermined threshold levels.

* * * * *